United States Patent [19]
DeMeritt et al.

[11] Patent Number: 4,797,144
[45] Date of Patent: Jan. 10, 1989

[54] DEEP PRESSING MOLD AND PROCESS FOR MOLDED OPTICAL ELEMENTS

[75] Inventors: Jeffery A. DeMeritt, Painted Post; Thomas E. Patykula, Elmira; Paul A. Sachenik, Corning, all of N.Y.

[73] Assignee: Corning Glass Works, Corning, N.Y.

[21] Appl. No.: 75,518

[22] Filed: Jul. 20, 1987

[51] Int. Cl.$^4$ ............................................. C03B 23/00
[52] U.S. Cl. .................................. 65/102; 65/68; 65/76; 65/321; 65/323
[58] Field of Search ................. 65/321, 323, 102, 305, 65/68, 76

[56] References Cited
U.S. PATENT DOCUMENTS 944,053  12/1909  Savage .................................. 65/321
4,629,489  12/1986  Hirota et al. ........................ 65/102

Primary Examiner—Arthur Kellogg
Attorney, Agent, or Firm—Walter S. Zebrowski

[57] ABSTRACT

A method and apparatus for molding precision optical quality glass elements having complex and concave surfaces requires the apportionment of relative movement between two opposing mold surfaces. First and second molds are contained within a floating alignment sleeve, thereby defining a mold cavity within which an essentially arbitrarily-shaped glass preform is placed. The first mold is moved in the alignment sleeve until stopped by a calibrated standoff. Thereafter, pressing is continued with the second mold moving in the alignment sleeve until opposing surfaces are completely formed at substantially the same time.

12 Claims, 2 Drawing Sheets

DEEP PRESSING MOLD AND PROCESS FOR MOLDED OPTICAL ELEMENTS

CROSS REFERENCE TO RELATED APPLICATIONS

This application is related in part to the following United States patents, each of which is assigned to the assignee of the present invention, and incorporated herein by reference:

"Moldable Fluoroaluminophosphate Glasses", Olszewski et al, U.S. Pat. No. 4,362,819, Dec. 7, 1982;

"Lead Aluminoborofluorosilicate Moldable Glasses", Leroy et al, U.S. Pat. No. 4,447,550, May 8, 1984; and "Process to Mold Precision Glass Articles", Marechal et al, U.S. Pat. No. 4,481,023, Nov. 6, 1984.

This application is also related to the following copending applications, each of which are assigned to the assignee of the present invention, and incorporated herein by reference:

"Kinematically Determinate Mold Assembly", Paul S. Schmitt, Ser. No. 940,120, filed Dec. 10, 1986, now U.S. Pat. No. 4,696,692;

"Balanced Molding of Optical Elements", Paul S. Schmitt, Ser. No. 071,405, filed July 9, 1987;

"Expanded Beam Waveguide Connector" J. A. DeMeritt, Ser. No. 075,573 filed July 20, 1987; and "Simultaneously Grinding and Polishing Preforms for Optical Lenses", Darcangelo et al, Ser. No. 940,275, filed Dec. 10, 1986.

BACKGROUND OF THE INVENTION

This invention relates generally to methods and apparatus used to produce precision optical elements, and more particularly to such methods and apparatus for molding optical elements having complex and concave surfaces.

Precision optical elements require highly polished surfaces of exacting figure and surface quality. The surfaces demand fabrication in proper geometric relation to each other and, where the elements are to be used in transmission applications, they will be prepared from a material of controlled, uniform, and isotropic refractive index.

Precision optical elements of glass are customarily produced via one of two complex, multi-step processes. In the first, a glass batch is melted in a conventional manner and the melt formed into a glass body having a controlled and homogeneous refractive index. Thereafter, the body may be reformed utilizing well-known repressing techniques to yield a shape approximately the desired final article. The surface figure and finish of the body at this stage of production, however, are not adequate for image forming optics. The rough article is fine annealed to develop the proper refractive index and the surface figure improved via conventional grinding practices. In the second method, the glass melt is formed into a bulk body which is immediately fine annealed and substantially cut and ground to articles of a desired configuration.

Both processes are subject to similar limitations. The surface profiles that are produced through grinding are normally restricted to conic sections, such as flats, spheres, and parabolas. Other shapes and, in particular, general aspheric surfaces are difficult to grind. In both processes, the ground optical surfaces are polished employing conventional, but complicated, polishing techniques which strive to improve surface finish without compromising the surface figure. In the case of aspheric surfaces, this polishing demands highly skilled and expensive handworking. A final finishing operation, viz, edging, is commonly required. Edging insures that the optical and mechanical axes of a spherical lens coincide. Edging, however, does not improve the relationship of misaligned aspheric surfaces, which factor accounts in part for the difficulty experienced in grinding such lenses.

The direct molding of lenses to the finished state could, in principle, eliminate the grinding, polishing, and edging operations which are especially difficult and time consuming for aspheric lenses. Indeed, molding processes are utilized for fabricating plastic lenses. Existing plastics suitable for optical applications are, nevertheless, only available in a limited refractive index and dispersion range. Furthermore, many plastics scratch easily and are prone to the development of yellowing, haze, and birefringence. The use of abrasion-resistant and antireflective coatings has not fully solved those failings. Moreover, plastic optical elements are subject to distortion from mechanical forces, humidity, and heat. Both the volume and refractive index of plastics varies substantially with changes in temperature, thereby limiting the temperature interval over which they are useful.

The overall properties of glass render it generally superior to plastic as an optical material. Glass is a much better substrate for the application of multilayer antireflection coatings because it is chemically inert, dimensionally stable, and can be coated at elevated temperatures. As described above, glass also has excellent environmental performance over a broad range of temperature, humidity, and other environmental conditions. This performance is due to its low coefficient of thermal expansion, its essential imperviousness to water absorption, its high resistance to other environmental attacks (e.g., salt spray, fungus, and acids), and its resistance to other atmospheric contaminants. Additionally, glass has a very high mechanical strength, allowing precision optical elements formed of glass to perform without optical degradation, or mechancial deformation while under stress. Conventional hot pressing of glass, however, does not provide the exacting surface figures and surface qualities demanded for image forming optics. The presence of chill wrinkles in the surface and surface figure deviations constitute chronic problems. As observed above, similar problems can be encountered in conventional repressing techniques.

Various processes have been devised to correct those problems, such processes frequently involving isothermal pressing, i.e., utilizing heated molds so that the temperature of the glass being molded will be essentially the same of that of the molds, the use of gaseous environments inert to the glass and mold materials during the pressing operation, and/or the use of materials of specifically defined compositions in the construction of the molds.

U.S. Pat. No. 4,481,023—Marechal and Maschmeyer shows and describes an improved mold for precisely pressing a glass preform which has an overall geometry similar to the desired final lens. A top and a bottom mold have molding cavities which precisely match the configuration of the final lens. A glass preform is heated to the molding temperature and the mold parts are separately heated. The molds are brought together against a ring having a thickness which governs the thickness of the lens to be molded.

In such a molding operation, the molding of the two opposed optical surfaces should be balanced. Balanced molding of a lens means that the degree to which the glass fills the voids between both top and bottom mold surfaces is equivalent. This is typically measured by the radii between each lens surface and the common sidewall. Copending U.S. patent applications Ser. Nos. 940,120, filed Dec. 10, 1986, entitled "Kinematically Determinate Mold Assembly", and 071,405 filed July 9, 1987, entitled "Balanced Molding of Optical Elements", respectively show and claim a mold assembly which can be controlled in accordance with a prescribed balanced molding technique utilizing adjustments to the closing movement of the molds.

The molding of aspheric lenses in accordance with the above described references requires that a precise preform, or blank, be produced with two polished surfaces. These precise preforms are then pressed in a mold to the final finished form. For example, for small lenses for audio and video players, the preform shape is a bi-convex lens of about 7 to 14 millimeters in diameter. Computer modeling of glass flow is generally used to assist in the development of the precise preform shape. Thereafter, one of two processes are typically used to produce the preform. The first involves a grinding process to produce the general shape of the preform, followed by conventional lapping and polishing steps to produce the required finish on the lens preform. In the second process, as shown and claimed in copending U.S. patent application Ser. No. 940,275, filed Dec. 10, 1986, entitled "Simultaneously Grinding and Polishing Preforms for Optical Lenses", a ground and polished optical surface on a glass lens preform is produced in a single operation. Either method, however, is limited in its ability to prevent unfinished surfaces or flashing in complex and concave mold surfaces without the use of preforms of a precise shape. In fact, there are shapes for which no simple preform can be made that will yield finished surfaces without flashing. Such considerations become critical in the production of precision optical elements as shown and claimed in copending U.S. patent application Ser. No. 075,573, filed July 20, 1987, entitled "Expanded Beam Waveguide Connector".

It is, therefore, a general object of the present invention to provide a method and apparatus for molding precision optical elements by completing the molding operation of their two optical surfaces at substantially the same time. More specifically, it is an object of the present invention to provide a method and apparatus for molding precision optical elements without the necessity of utilizing precise and complicated preforms.

It is another object of the present invention to provide a method and apparatus of molding precision optical elements having complex and concave optical surfaces without the formation of unfinished surfaces and flashing.

These and other objects of the present invention are provided by independently controlling the motion of pressing tools in an alignment sleeve. In accordance with the present invention, opposing optical surfaces are formed substantially at the same time from an essentially arbitrarily-shaped preform by apportioning the total relative motion of their respective molds towards one another as some motion of one mold within the alignment sleeve and some motion of the other mold within the alignment sleeve. Such apportioning may be controlled by apparatus according to the present invention in which a calibrated standoff is attached to the alignment sleeve in order to limit the movement of one mold after its respective molding surface has contacted the arbitrarily-shaped preform.

The foregoing and other objects, features and advantages of the present invention will be better understood from the following more detailed description, when considered in conjunction with the accompanying drawings wherein:

DESCRIPTION OF THE PREFERRED EMBODIMENT

Figure 1:
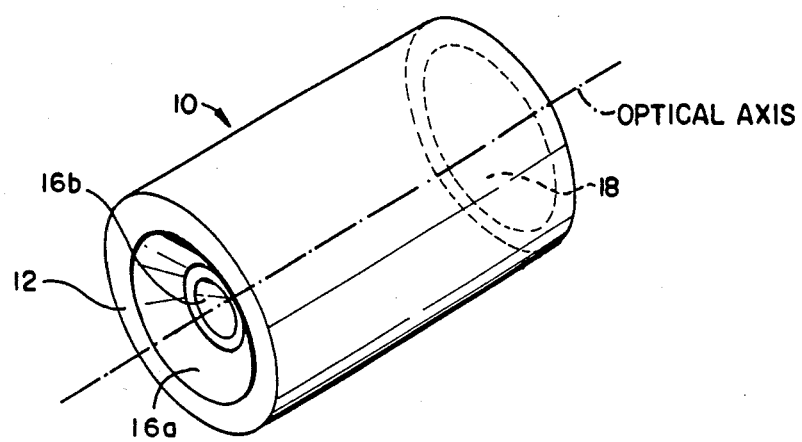
FIG. 1 shows a exemplary precision optical element molded in accordance with the present invention.

Referring now to the drawings, wherein like characters designate like or corresponding parts throughout the several views, there is shown in FIG. 1 a precision optical element typical of those which may be produced in accordance with the present invention. Further details of such precision optical elements may be found in copending U.S. patent application Ser. No. 075,573, filed July 20, 1987, entitled "Expanded Beam Waveguide Connector", which is assigned to the assignee of the present invention, and incorporated herein by reference.

Figure 3:
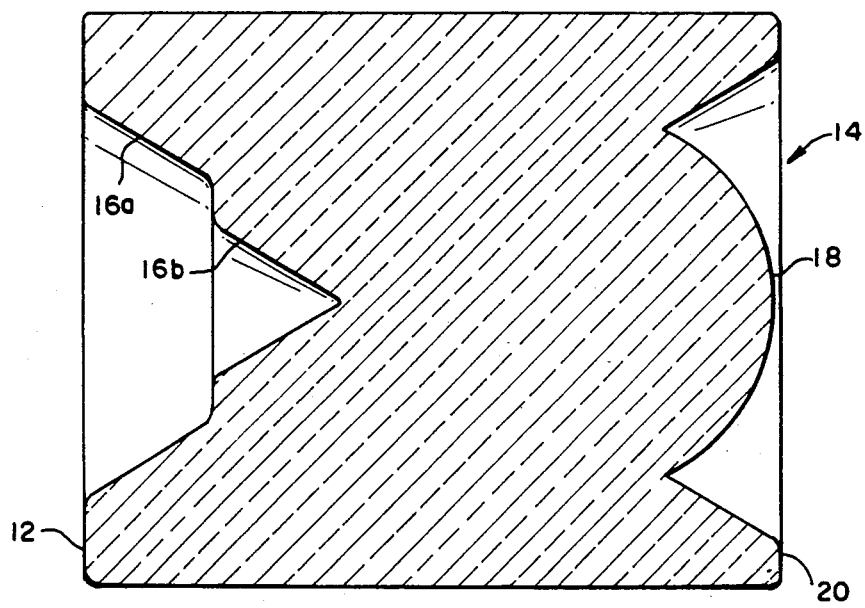
FIG. 3 illustrates in sectional view the optical element shown in FIG. 1.

As shown in FIG. 1, in conjunction with FIG. 3, the optical element 10 includes first and second optical surfaces 12 and 14 for use in expanded beam waveguide connections. The first optical surface 12 is comprised generally of a pair of concentric conical depressions 16a and 16b, while the second optical surface 14 is comprised generally of an aspheric lens 18 surrounded by an annular reference surface 20. Due to the substantially complex and concave nature of the surfaces 12 and 14, conventional pressing techniques which utilize precisely designed preforms or balanced molding techniques as described in copending patent application Ser. No. 071,405, filed July 9, 1987, entitled "Balanced Molding of Optical Elements", are often incapable of forming the first and second optical surfaces 12 and 14 at substantially the same time without serious degradations.

As in the above-referenced copending U.S. patent application Ser. No. 071,405, filed July 9, 1987, and referring now to FIGS. 2a, 2b, and 2c, the mold assembly used in accordance with the present invention.consists generally of a first mold 22 (in this case the top mold) having a molding surface 24, and a second, or bottom mold 26 having an opposed molding surface 28. An alignment sleeve 30 has a cavity 32 extending therethrough. The opposed molding surfaces 24 and 28 of the first and second molds 22 and 26 cooperate with the opposed open ends of the cavity 32 to form an enclosed mold cavity of fixed volume when the molds 22 and 26 are closed. An essentially arbitrarily shaped glass preform 34 to be molded is put into the mold cavity 32 and the molds 22 and 26 are moved together to press the glass, according to the present invention, into a precision optical element within the mold cavity 32. As shown in FIG. 2a, the preform 34 is shaped so as to contact the mold surface 28 first at the mold axis, thereby preventing entrapment of gases. Unlike the apparatus shown and claimed in copending U.S. patent application Ser. No. 071,405, filed July 9, 1987, in which the surface of the cavity in the sleeve is motionless, the alignment sleeve 30 of the present invention and its corresponding inner surface 32 is allowed to "float". That is, through the use of a free spring 36 (as shown), a captive spring, or any other means of frictional or viscous (e.g., flowing fluid) support, the total relative movement of the opposed molding surfaces 24 and 28 may be controlled to form the first and second optical surfaces 12 and 14 (FIG. 1) at substantially the same time by apportioning such total relative movement respectively between the first and second molds 22 and 26.

Figure 2C:
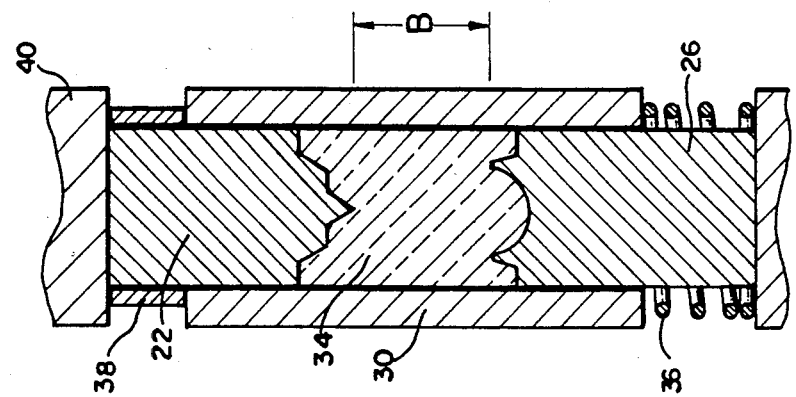
FIGS. 2a, 2b, and 2c illustrate the steps and apparatus required to mold the precision optical element shown in FIG. 1.
Figure 2B:
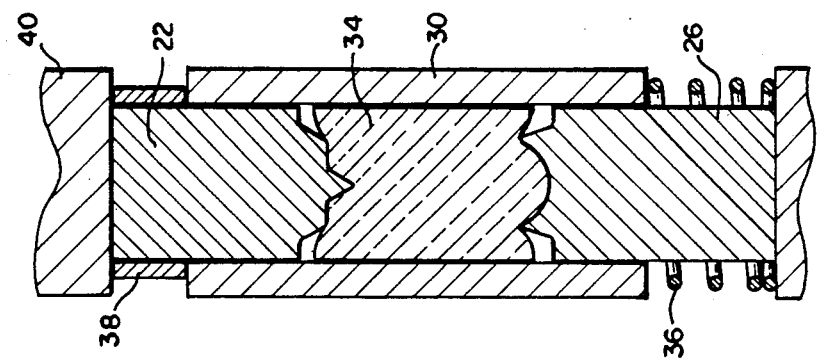
Figure 2A:
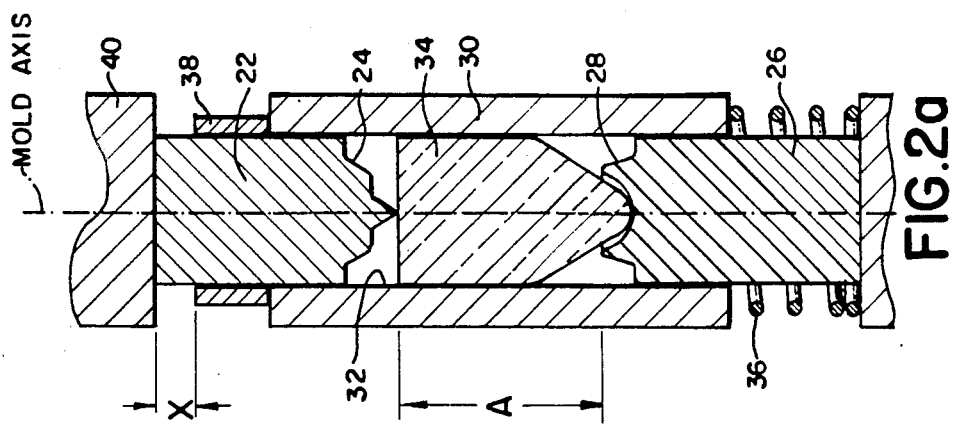

As can be seen with reference to FIGS. 2a and 2c, the total relative movement of the opposed molding surfaces 24 and 28 between the points at which they first touch the preform 34, and when the first and second optical surfaces 12 and 14 are formed is defined by the difference between the distances A and B. It has been found that such forming of the first and second optical surfaces 12 and 14 is accomplished by providing the alignment sleeve 30 with a known length of extension x. That is, by attaching a calibrated standoff 38 in the form of an annular shaped ring coupled to the top open end of the alignment sleeve 30, relative motion of the top mold 22 within the alignment sleeve 30 after the molding surface 24 has first contacted the preform 34 is limited to the predetermined length of extension x.

A method of molding the precision optical element shown in FIG. 1 is generally comprised of the following steps. The first and second molds 22 and 26 are moved together within the alignment sleeve 30 to press the arbitrarily-shaped preform 34 into the optical element, the movement of the first mold 22 relative to the second mold 26 being controlled in accordance with the present invention. By floating the alignment sleeve 30 upon the free spring 36, the first mold 22 is driven by the press head 40 a predetermined distance x past the point at which the molding surface 24 first contacts the preform 4. Thereafter, relative motion between the first mold 22 and the alignment sleeve 30 is prevented by the calibrated standoff 38.

Once the relative movement of the first mold 22 within the alignment sleeve 30 is stopped by the calibrated standoff 38 (FIG. 2b), further driving by the press head 40 and the floating nature of the alignment sleeve 30 causes relative motion of the second mold 26 within the alignment sleeve 30. Gaps formed between the preform 34 and the molding surfaces 24 and 28 (FIG. 2b) are filled substantially at the same time without entrapping gases, thus forming the first and second optical surfaces 12 and 14 as shown in FIG. 2c. The extent of pressing to such condition can be controlled by selecting an appropriate ratio of motion of the first mold 22 within the sleeve 30 and of the second mold 26 within the sleeve 30. This ratio is controlled by the ratio of the predetermined length of extension x to total displacement (A−B) of the first mold 22 to the second mold 26.

In order to determine the length of extension x, computer modeling of pressing a proposed preform shape within a given set of molds, as described in copending U.S. patent application Ser. No. 071,405, filed July 9, 1987, is utilized to provide an initial estimate of the relative motions required among the first mold 22, second mold 26, and the alignment sleeve 30 in order to simultaneously fill both ends of the mold cavity. A calibrated standoff 38 of the required length may then be determined, the apparatus assembled, and an experimental optical element pressed to determine whether molding is complete at both surfaces, and whether either end has a flashing or unfinished surface. If pressing is more complete on one end than on the other, the standoff 38 is adjusted in length appropriately. That is, if the excess of material causing a flashing or "fin" is on the end towards the standoff 38, then the standoff 38 is lengthened. On the other hand, if the excess is on the end away from the standoff 38, then the standoff 38 is shortened. Repeated pressings and adjustments of the length of the calibrated standoff 38 are required until the pressing is satisfactory.

The material molded may either be optical quality glass or plastic, or any other material to the extent that it has a controllable viscosity of sufficient magnitude to make other forces involved, such as gravity, or acceleration negligible. Suitable such compositions of optical quality glass are shown and claimed in U.S. Pat. Nos. 4,362,819—Olszewski et al (moldable fluoroaluminophosphate glasses), and 4,447,550—Leroy et al (lead aluminoborofluorosilicate moldable glasses), both of which are assigned to the assignee of the present invention and incorporated herein by reference.

An examplary optical element was molded utilizing a preform 34 consisting essentially of 39.0% $P_2O_5$, 5.0% $Na_2O$, 4.7% F, 24.0% PbO, 20.0% $B_2O$, 1.9% $Li_2O$, and 5.4% $Al_2O_3$ (weight percent on an analysis basis). The above described preform 34 was then placed in a mold comprised generally of nickel-plated, inconel parts, although carbide or tool steels (e.g., M2 steel) would be equally suitable. In a presently preferred embodiment of the invention, the alignment sleeve 30 is formed of carbide steel and the mold is heated to a temperature of 377° C. during pressing.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. An apparatus for molding an optical element having first and second opposed optical surfaces comprising a first mold having a molding surface adapted to form said first optical surface, a second mold having an opposed molding surface adapted to form said second optical surface, an alignment sleeve defining a cavity extending therethrough to accommodate said first and second molds, said molding surfaces being cooperable within said cavity to form an enclosed mold cavity of fixed volume, means for independently controlling the movement of said first mold relative to said second mold, means in operable relationship with said alignment sleeve for stopping the movement of said first mold relative to said alignment sleeve when the distance traveled during such movement equals a distance corresponding to the total relative movement between said first and second molds necessary to form the optical surfaces at substantially the same time multiplied by a predetermined ratio.

2. The apparatus of claim 1 wherein said predetermined ratio comprises the ratio between the movement of said first mold relative to said alignment sleeve and the total relative movement between the first and second molds.

3. An apparatus for molding an optical element having first and second opposed optical surfaces comprising a first mold having a molding surface adapted to form said first optical surface, a second mold having an opposed molding surface adapted to form said second optical surface, an alignment sleeve defining a cavity extending therethrough to accommodate said first and second molds, said molding surfaces being cooperable within said cavity to form an enclosed mold cavity of fixed volume, means for independently controlling the movement of said first mole relative to said second mold, means in operable relationship with said alignment sleeve for stopping the movement of said first mold relative to said alignment sleeve after said first mold traversed a predetermined distance.

4. The apparatus of claim 3 further comprising means for floating said alignment sleeve.

5. The apparatus of claim 4 wherein said means for floating comprises a spring operatively associated with said adjustment sleeve.

6. The apparatus of claim 5 further comprising a press head operatively associated with said first mold.

7. The apparatus of claim 3 wherein said predetermined distance equals a distance corresponding to the total relative movement between said first and second molds necessary to form the optical surfaces at substantially the same time multiplied by a predetermined ratio.

8. The apparatus of claim 7 wherein said predetermined ratio comprises the ratio between the movement of said first mold relative to said alignment sleeve and the total relative movement between the first and second molds.

9. A method of molding an optical element having first and second opposed optical surfaces comprising the steps of providing a first mold having a molding surface adapted to form said first optical surface, providing a second mold having an opposing molding surface adapted to form said second optical surface, providing an alignment sleeve defining a cavity extending therethrough to accommodate said first and second molds, providing means operatively associated with said alignment sleeve for floating said sleeve, disposing said first and second molds within said alignment sleeve cavity and in a slidable engagement therewith such that said molding surfaces are in a cooperable relationship defining an enclosed mold cavity, disposing a quantity of molding material within said mold cavity, moving said first mold within said sleeve cavity along the longitudinal axis thereof in a direction toward said second mold, controlling the movement of said first mold so that it is independent of the movement of said second mold, providing means in operable relationship with said alignment sleeve for stopping the movement of said first mold relative to said alignment sleeve after said first mold traversed a predetermined distance, stopping the movement of said first mold relative to said alignmenet sleeve by said means for stopping, moving said second mold within said sleeve cavity along the longitudinal axis thereof in a direction toward said first mold, and stopping the movement of said second mold relative to said alignment sleeve defining a fixed mold cavity volume between said mold surfaces thereby forming an optical element having opposed optical surfaces.

10. The method of claim 9 wherein the movement of said first and second molds is independently controlled.

11. The method of claim 9 wherein said means for floating is a spring.

12. The method of claim 11 wherein said means for stopping is a standoff of predetermined length.

* * * * *